(12) United States Patent
Beer Mohideen

(10) Patent No.: US 12,505,649 B2
(45) Date of Patent: Dec. 23, 2025

(54) OBJECT DETECTION WITH A DEEP LEARNING ACCELERATOR OF ARTIFICIAL NEURAL NETWORKS

(71) Applicant: Micron Technology, Inc., Boise, ID (US)

(72) Inventor: Sheik Dawood Beer Mohideen, Seattle, WA (US)

(73) Assignee: Micron Technology, Inc., Boise, ID (US)

( * ) Notice: Subject to any disclaimer, the term of this patent is extended or adjusted under 35 U.S.C. 154(b) by 683 days.

(21) Appl. No.: 17/727,649

(22) Filed: Apr. 22, 2022

(65) Prior Publication Data

US 2022/0358748 A1 Nov. 10, 2022

Related U.S. Application Data

(60) Provisional application No. 63/185,280, filed on May 6, 2021.

(51) Int. Cl.
*G06V 10/764* (2022.01)
*G06F 17/16* (2006.01)
(Continued)

(52) U.S. Cl.
CPC ............ *G06V 10/764* (2022.01); *G06F 17/16* (2013.01); *G06V 10/25* (2022.01); *G06V 10/40* (2022.01); *G06V 10/82* (2022.01); *G06V 10/955* (2022.01)

(58) Field of Classification Search
CPC .... G06V 10/82; G06V 10/806; G06V 10/764; G06V 10/40; G06V 10/25; G06V 20/46;
(Continued)

(56) References Cited

U.S. PATENT DOCUMENTS 10,234,990 B2 * 3/2019 Hoch .................. G06F 3/04883
2020/0034645 A1 1/2020 Fan et al.
2020/0394458 A1 * 12/2020 Yu .......................... G06N 3/045

FOREIGN PATENT DOCUMENTS

CN 112257727 1/2021

OTHER PUBLICATIONS

Guo, Chaoxu, et al. "Augfpn: Improving multi-scale feature learning for object detection." Proceedings of the IEEE/CVF conference on computer vision and pattern recognition. 2020. (Year: 2020).*

(Continued)

*Primary Examiner* — Courtney Joan Nelson
(74) *Attorney, Agent, or Firm* — Greenberg Traurig

(57) ABSTRACT

Systems, devices, and methods related to an object detector and a deep learning accelerator are described. For example, a computing apparatus has an integrated circuit device with the deep learning accelerator configured to execute instructions generated by a compiler from a description of an artificial neural network of the object detector. The artificial neural network includes a first cross stage partial network to extract features from an image and a second cross stage partial network to combine the features to identify a region of interest in the image showing an object. The artificial neural network uses a technique of minimum cost assignment in assigning a classification to the object and thus avoids post processing of non-maximum suppression.

20 Claims, 8 Drawing Sheets

(51) Int. Cl.
    *G06V 10/25*    (2022.01)
    *G06V 10/40*    (2022.01)
    *G06V 10/82*    (2022.01)
    *G06V 10/94*    (2022.01)
(58) Field of Classification Search
    CPC .. G06V 10/7715; G06V 20/698; G06V 30/18; G06V 10/955; G06N 3/045; G06N 3/0464; G06N 20/00; G06N 3/04; G06T 2207/20084; G06T 2207/20081; G06T 7/73; G06F 17/16; G06F 18/253; G06F 18/2413; G06F 18/24147
    See application file for complete search history.

(56)         References Cited

OTHER PUBLICATIONS

Wang, Chien-Yao, et al. "CSPNet: A new backbone that can enhance learning capability of CNN." Proceedings of the IEEE/CVF conference on computer vision and pattern recognition workshops. 2020. (Year: 2020).*

Yufei Ma, Naveen Suda, Yu Cao, Sarma Vrudhula, Jae-sun Seo, ALAMO: FPGA acceleration of deep learning algorithms with a modularized RTL compiler, Integration, vol. 62, 2018, pp. 14-23, ISSN 0167-9260, https://doi.org/10.1016/j.vlsi.2017.12.009 (Year: 2018).*

A. Shawahna, S. M. Sait and A. El-Maleh, "FPGA-Based Accelerators of Deep Learning Networks for Learning and Classification: A Review," in IEEE Access, vol. 7, pp. 7823-7859, 2019, doi: 10.1109/ACCESS.2018.2890150 (Year: 2019).*

Guo, Chaoxu, et al., "AugFPN: Improving Multi-Scale Feature Learning for Object Detection." IEEE/CVF Conference on Computer Vision and Pattern Recognition (CVPR), Aug. 5, 2020.

International Search Report and Written Opinion, PCT/US2022/026746, mailed on Aug. 12, 2022.

Ma, Yufei, et al., "ALAMO: FPGA acceleration of deep learning algorithms with a modularized RTL compiler." Integration, the VLSI Journal vol. 62, Jan. 5, 2018.

Wang, Chien-Yao, et al., "CSPNet: A New Backbone that can Enhance Learning Capability of CNN." IEEE/CVF Conference on Computer Vision and Pattern Recognition Workshops (CVPRW), Jul. 28, 2020.

Chien-Yao Wang, Alexey Bochkovskiy, Hong-Yuan Mark Liao, "Scaled-YOLOv4: Scaling Cross Stage Partial Network", arXiv:2011.08036v2 [cs.CV], Feb. 22, 2021.

Chien-Yao Wang, Hong-Yuan Mark Liao, I-Hau Yeh, Yueh-Hua Wu, Ping-Yang Chen, Jun-Wei Hsieh, "CSPNet: A New Backbone that can Enhance Learning Capability of CNN", arXiv:1911.11929v1 [cs.CV] Nov. 27, 2019.

Peize Sun, Yi Jiang, Enze Xie, Zehuan Yuan, Changhu Wang, Ping Luo, "OneNet: Towards End-to-End One-Stage Object Detection", arXiv:2012.05780v1 [cs.CV], Dec. 10, 2020.

* cited by examiner

OBJECT DETECTION WITH A DEEP LEARNING ACCELERATOR OF ARTIFICIAL NEURAL NETWORKS

RELATED APPLICATIONS

The present application claims priority to Prov. U.S. Pat. App. Ser. No. 63/185,280 filed May 6, 2021, the entire disclosures of which application are hereby incorporated herein by reference.

TECHNICAL FIELD

At least some embodiments disclosed herein relate to image processing and object detection/recognition in general and more particularly, but not limited to, implementations of Artificial Neural Networks (ANNs) for object detection/recognition in images.

BACKGROUND

An Artificial Neural Network (ANN) uses a network of neurons to process inputs to the network and to generate outputs from the network.

Deep learning has been applied to many application fields, such as computer vision, speech/audio recognition, natural language processing, machine translation, bioinformatics, drug design, medical image processing, games, etc.

BRIEF DESCRIPTION OF THE DRAWINGS

The embodiments are illustrated by way of example and not limitation in the figures of the accompanying drawings in which like references indicate similar elements.

DETAILED DESCRIPTION

At least some embodiments disclosed herein provide a high performance object detector to identify an object in an image. The object detector uses cross stage partial networks in feature extraction and in feature fusion to identify region of interest, and uses minimum cost assignment in object classification to avoid Non-Maximum Suppression. The object detector can be implemented via a Deep Learning Accelerator to achieve performance comparable to acceleration via Graphics Processing Units (GPUs).

Figure 1:
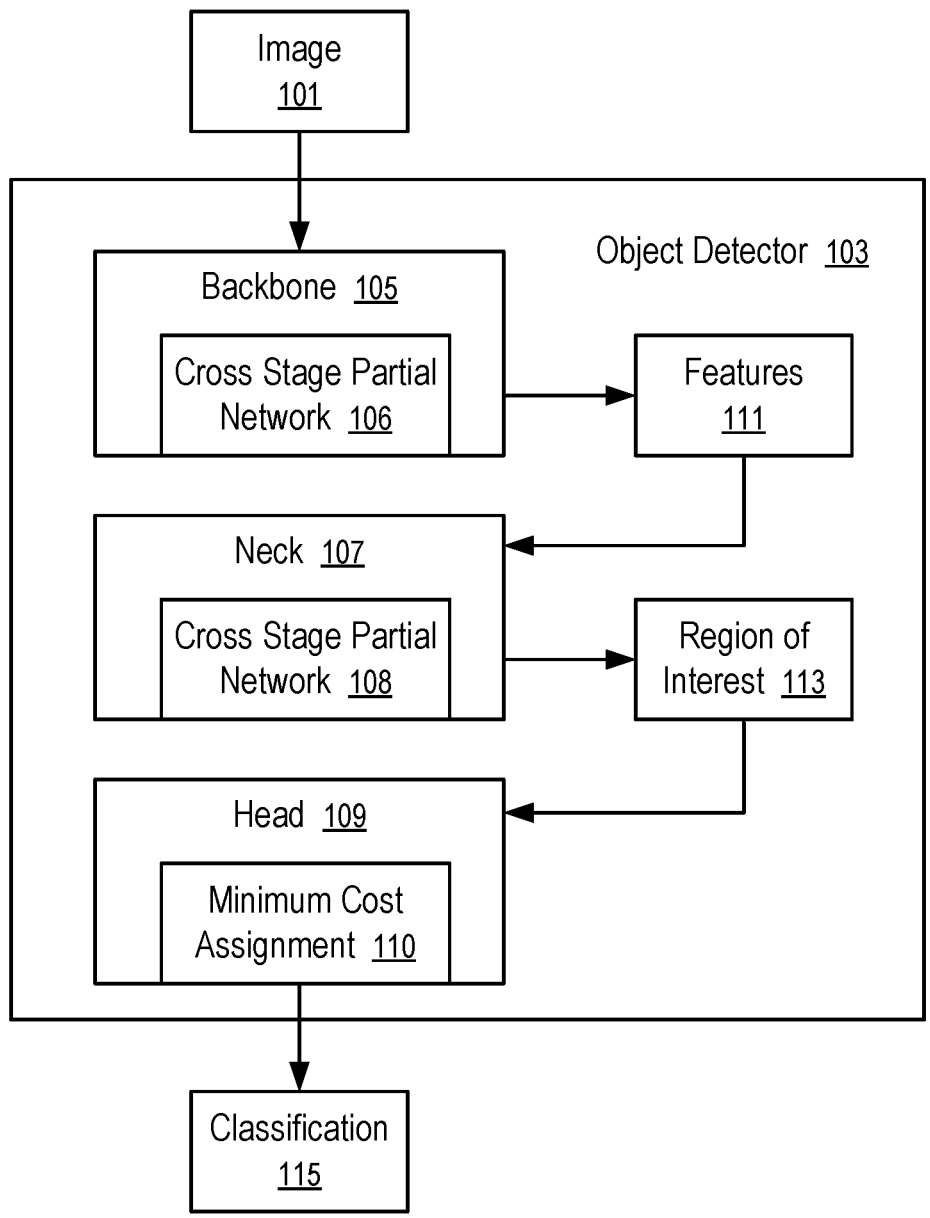
FIG. 1 shows an object detector according to one embodiment.

FIG. 1 shows an object detector 103 according to one embodiment.

The object detector 103 implemented via an artificial neural network can include a backbone 105, a neck 107, and a head 109. The backbone 105 processes an input image 101 to generate features 111. The neck 107 combines or fuses features to identify a region of interest 113. The head 109 assigns a classification 115 as a label for the object depicted in the region of interest 113 in the image 101.

In FIG. 1, the backbone 105 is implemented via a cross stage partial network 106; and the neck 107 is implemented via another cross stage partial network 108.

A cross stage partial network is a partial dense artificial neural network that splits the gradient flow for propagation through different network paths. The use of a cross stage partial network can reduce computation, and improve speed and accuracy.

In FIG. 1, the head 109 uses minimum cost assignment 110 in object classification and bounding box regression.

Minimum cost assignment is a technique to sum classification cost and location cost between sample and ground-truth. For each object ground-truth, only one sample of minimum cost is assigned as the positive sample; others are all negative samples. The use of minimum cost assignment can eliminate the need for costly post-processing operations of non-maximum suppression.

The object detector 103 of FIG. 1 includes the combination of the use of cross stage partial networks 106 and 108 in the backbone 105 and the neck 107 and the use of minimum cost assignment 110 in the head 109.

For example, the backbone 105 and the neck 107 can be implemented in a way as discussed in Chien-Yao Wang, et al., "Scaled-YOLOv4: Scaling Cross Stage Partial Network", arXiv:2011.08036v2 (cs.CV), Feb. 22, 2021, the disclosure of which is hereby incorporated herein by reference.

For example, the head 109 can be implemented in a way as discussed in Peize Sun, et al., "OneNet: Towards End-to-End One-Stage Object Detection", arXiv:2012.05780v1 (cs.CV), Dec. 10, 2020, the disclosure of which is hereby incorporated herein by reference.

As a result, the object detector 103 can be implemented efficiently on an integrated circuit device having a Deep Learning Accelerator (DLA) and random access memory. The object detector 103 implemented with a DLA can have high performance similar to a GPU implementation without the high cost of GPUs.

Integrated circuits can be configured to implement the computation of Artificial Neural Networks (ANNs) with reduced energy consumption and computation time. Such an integrated circuit device can include a Deep Learning Accelerator (DLA) and random access memory. A compiler can generate instructions to be executed by the DLA from a description of an Artificial Neural Network. The random access memory is configured to store parameters of the Artificial Neural Network (ANN) and instructions having matrix operands as compiled by the compiler. The instructions stored in the random access memory are executable by the Deep Learning Accelerator (DLA) to implement matrix computations according to the Artificial Neural Network (ANN).

For example, the DLA and a compiler can be implemented in a way as discussed in U.S. patent application Ser. No. 17/092,040, filed Nov. 6, 2020 and entitle "Compiler with an Artificial Neural Network to Optimize Instructions Generated for Execution on a Deep Learning Accelerator of Artificial Neural Networks," the disclosure of which application is hereby incorporated herein by reference.

A Deep Learning Accelerator (DLA) can include a set of programmable hardware computing logic that is specialized and/or optimized to perform parallel vector and/or matrix calculations, including but not limited to multiplication and accumulation of vectors and/or matrices.

Further, the Deep Learning Accelerator can include one or more Arithmetic-Logic Units (ALUs) to perform arithmetic and bitwise operations on integer binary numbers.

The Deep Learning Accelerator is programmable via a set of instructions to perform the computations of an Artificial Neural Network (ANN).

The granularity of the Deep Learning Accelerator operating on vectors and matrices corresponds to the largest unit of vectors/matrices that can be operated upon during the execution of one instruction by the Deep Learning Accelerator. During the execution of the instruction for a predefined operation on vector/matrix operands, elements of vector/matrix operands can be operated upon by the Deep Learning Accelerator in parallel to reduce execution time and/or energy consumption associated with memory/data access. The operations on vector/matrix operands of the granularity of the Deep Learning Accelerator can be used as building blocks to implement computations on vectors/matrices of larger sizes.

The implementation of an Artificial Neural Network can involve vector/matrix operands having sizes that are larger than the operation granularity of the Deep Learning Accelerator. To implement such an Artificial Neural Network using the Deep Learning Accelerator, computations involving the vector/matrix operands of large sizes can be broken down to the computations of vector/matrix operands of the granularity of the Deep Learning Accelerator. The Deep Learning Accelerator can be programmed via instructions to carry out the computations involving large vector/matrix operands. For example, atomic computation capabilities of the Deep Learning Accelerator in manipulating vectors and matrices of the granularity of the Deep Learning Accelerator in response to instructions can be programmed to implement computations in an Artificial Neural Network.

In some implementations, the Deep Learning Accelerator lacks some of the logic operation capabilities of a Central Processing Unit (CPU). However, the Deep Learning Accelerator can be configured with sufficient logic units to process the input data provided to an Artificial Neural Network and generate the output of the Artificial Neural Network according to a set of instructions generated for the Deep Learning Accelerator. Thus, the Deep Learning Accelerator can perform the computation of an Artificial Neural Network with little or no help from a Central Processing Unit (CPU) or another processor. Optionally, a conventional general purpose processor can also be configured as part of the Deep Learning Accelerator to perform operations that cannot be implemented efficiently using the vector/matrix processing units of the Deep Learning Accelerator, and/or that cannot be performed by the vector/matrix processing units of the Deep Learning Accelerator.

An Artificial Neural Network can be described/specified in a standard format (e.g., Open Neural Network Exchange (ONNX)). A compiler can be used to convert the description of the Artificial Neural Network into a set of instructions for the Deep Learning Accelerator to perform calculations of the Artificial Neural Network. The compiler can optimize the set of instructions to improve the performance of the Deep Learning Accelerator in implementing the Artificial Neural Network.

The Deep Learning Accelerator can have local memory, such as registers, buffers and/or caches, configured to store vector/matrix operands and the results of vector/matrix operations. Intermediate results in the registers can be pipelined/shifted in the Deep Learning Accelerator as operands for subsequent vector/matrix operations to reduce time and energy consumption in accessing memory/data and thus speed up typical patterns of vector/matrix operations in implementing a typical Artificial Neural Network. The capacity of registers, buffers and/or caches in the Deep Learning Accelerator is typically insufficient to hold the entire data set for implementing the computation of a typical Artificial Neural Network. Thus, a random access memory coupled to the Deep Learning Accelerator is configured to provide an improved data storage capability for implementing a typical Artificial Neural Network. For example, the Deep Learning Accelerator loads data and instructions from the random access memory and stores results back into the random access memory.

The communication bandwidth between the Deep Learning Accelerator and the random access memory is configured to optimize or maximize the utilization of the computation power of the Deep Learning Accelerator. For example, high communication bandwidth can be provided between the Deep Learning Accelerator and the random access memory such that vector/matrix operands can be loaded from the random access memory into the Deep Learning Accelerator and results stored back into the random access memory in a time period that is approximately equal to the time for the Deep Learning Accelerator to perform the computations on the vector/matrix operands. The granularity of the Deep Learning Accelerator can be configured to increase the ratio between the amount of computations performed by the Deep Learning Accelerator and the size of the vector/matrix operands such that the data access traffic between the Deep Learning Accelerator and the random access memory can be reduced, which can reduce the requirement on the communication bandwidth between the Deep Learning Accelerator and the random access memory. Thus, the bottleneck in data/memory access can be reduced or eliminated.

Figure 2:
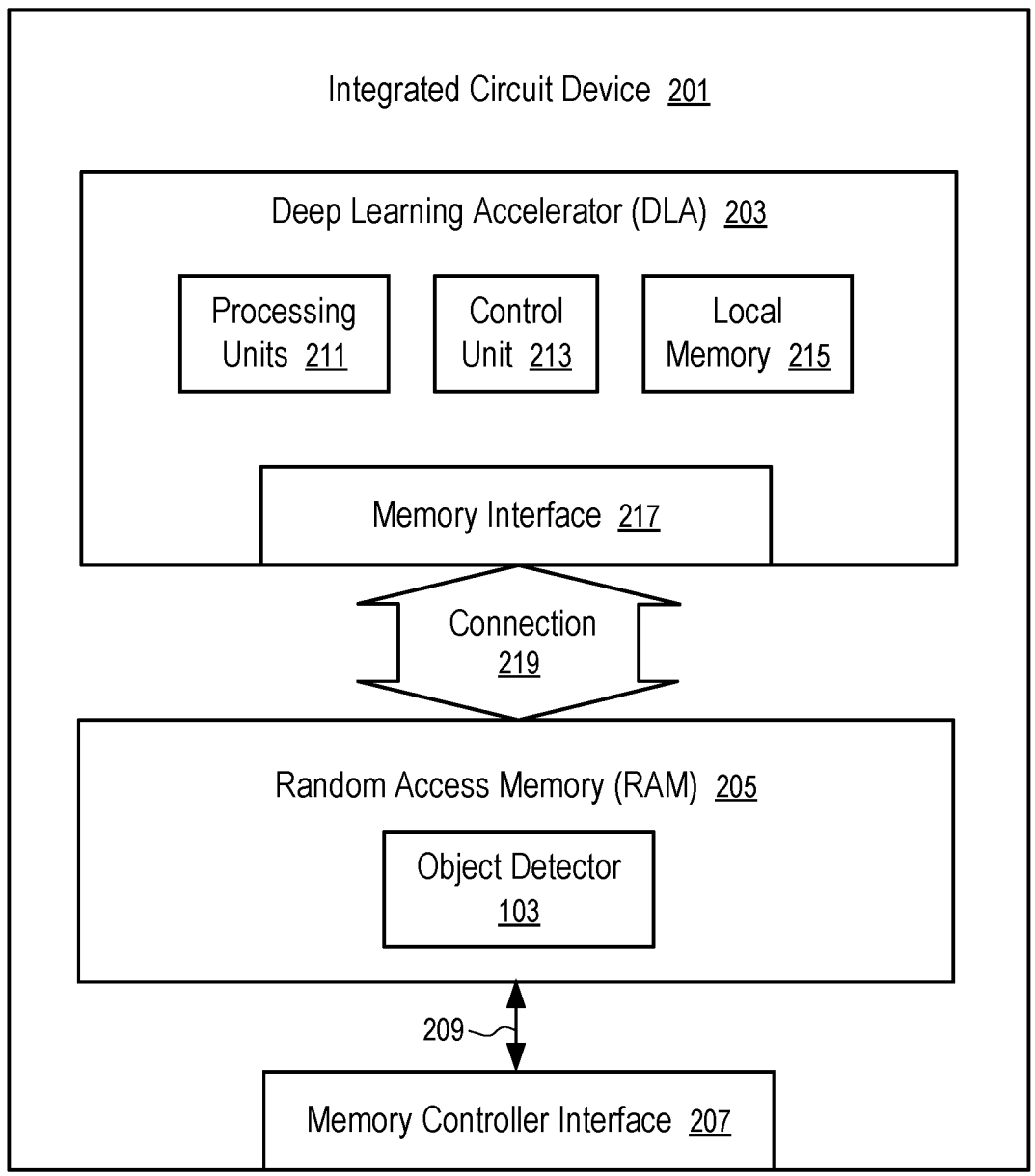
FIG. 2 shows an integrated circuit device having a Deep Learning Accelerator and random access memory to implement an object detector according to one embodiment.

FIG. 2 shows an integrated circuit device 201 having a Deep Learning Accelerator 203 and random access memory 205 to implement an object detector 103 according to one embodiment.

For example, the object detector 103 of FIG. 2 can have a neural network structure of the object illustrated in FIG. 1. A description of the object detector 103 can be compiled by a compiler to generate instructions for execution by the Deep Learning Accelerator 203 and the matrices to be used by the instructions. Thus, the object detector 103 in the random access memory 205 of FIG. 2 can include the instructions 305 and the matrices 307 generated by the compiler 303, as further discussed below in connection with FIG. 6.

The Deep Learning Accelerator 203 in FIG. 2 includes processing units 211, a control unit 213, and local memory 215. When vector and matrix operands are in the local memory 215, the control unit 213 can use the processing units 211 to perform vector and matrix operations in accordance with instructions. Further, the control unit 213 can load instructions and operands from the random access memory 205 through a memory interface 217 and a high speed/bandwidth connection 219.

The integrated circuit device 201 is configured to be enclosed within an integrated circuit package with pins or contacts for a memory controller interface 207.

The memory controller interface 207 is configured to support a standard memory access protocol such that the integrated circuit device 201 appears to a typical memory controller in a way same as a conventional random access memory device having no Deep Learning Accelerator 203. For example, a memory controller external to the integrated circuit device 201 can access, using a standard memory access protocol through the memory controller interface 207, the random access memory 205 in the integrated circuit device 201.

The integrated circuit device 201 is configured with a high bandwidth connection 219 between the random access memory 205 and the Deep Learning Accelerator 203 that are enclosed within the integrated circuit device 201. The bandwidth of the connection 219 is higher than the bandwidth of the connection 209 between the random access memory 205 and the memory controller interface 207.

In one embodiment, both the memory controller interface 207 and the memory interface 217 are configured to access the random access memory 205 via a same set of buses or wires. Thus, the bandwidth to access the random access memory 205 is shared between the memory interface 217 and the memory controller interface 207. Alternatively, the memory controller interface 207 and the memory interface 217 are configured to access the random access memory 205 via separate sets of buses or wires. Optionally, the random access memory 205 can include multiple sections that can be accessed concurrently via the connection 219. For example, when the memory interface 217 is accessing a section of the random access memory 205, the memory controller interface 207 can concurrently access another section of the random access memory 205. For example, the different sections can be configured on different integrated circuit dies and/or different planes/banks of memory cells; and the different sections can be accessed in parallel to increase throughput in accessing the random access memory 205. For example, the memory controller interface 207 is configured to access one data unit of a predetermined size at a time; and the memory interface 217 is configured to access multiple data units, each of the same predetermined size, at a time.

In one embodiment, the random access memory 205 and the integrated circuit device 201 are configured on different integrated circuit dies configured within a same integrated circuit package. Further, the random access memory 205 can be configured on one or more integrated circuit dies that allows parallel access of multiple data elements concurrently.

In some implementations, the number of data elements of a vector or matrix that can be accessed in parallel over the connection 219 corresponds to the granularity of the Deep Learning Accelerator operating on vectors or matrices. For example, when the processing units 211 can operate on a number of vector/matrix elements in parallel, the connection 219 is configured to load or store the same number, or multiples of the number, of elements via the connection 219 in parallel.

Optionally, the data access speed of the connection 219 can be configured based on the processing speed of the Deep Learning Accelerator 203. For example, after an amount of data and instructions have been loaded into the local memory 215, the control unit 213 can execute an instruction to operate on the data using the processing units 211 to generate output. Within the time period of processing to generate the output, the access bandwidth of the connection 219 allows the same amount of data and instructions to be loaded into the local memory 215 for the next operation and the same amount of output to be stored back to the random access memory 205. For example, while the control unit 213 is using a portion of the local memory 215 to process data and generate output, the memory interface 217 can offload the output of a prior operation into the random access memory 205 from, and load operand data and instructions into, another portion of the local memory 215. Thus, the utilization and performance of the Deep Learning Accelerator are not restricted or reduced by the bandwidth of the connection 219.

The random access memory 205 can be used to store the model data of an Artificial Neural Network and to buffer input data for the Artificial Neural Network. The model data does not change frequently. The model data can include the output generated by a compiler for the Deep Learning Accelerator to implement the Artificial Neural Network. The model data typically includes matrices used in the description of the Artificial Neural Network and instructions generated for the Deep Learning Accelerator 203 to perform vector/matrix operations of the Artificial Neural Network based on vector/matrix operations of the granularity of the Deep Learning Accelerator 203. The instructions operate not only on the vector/matrix operations of the Artificial Neural Network, but also on the input data for the Artificial Neural Network.

In one embodiment, when the input data is loaded or updated in the random access memory 205, the control unit 213 of the Deep Learning Accelerator 203 can automatically execute the instructions for the Artificial Neural Network to generate an output of the Artificial Neural Network. The output is stored into a predefined region in the random access memory 205. The Deep Learning Accelerator 203 can execute the instructions without help from a Central Processing Unit (CPU). Thus, communications for the coordination between the Deep Learning Accelerator 203 and a processor outside of the integrated circuit device 201 (e.g., a Central Processing Unit (CPU)) can be reduced or eliminated.

Optionally, the logic circuit of the Deep Learning Accelerator 203 can be implemented via Complementary Metal Oxide Semiconductor (CMOS). For example, the technique of CMOS Under the Array (CUA) of memory cells of the random access memory 205 can be used to implement the logic circuit of the Deep Learning Accelerator 203, including the processing units 211 and the control unit 213. Alternatively, the technique of CMOS in the Array of memory cells of the random access memory 205 can be used to implement the logic circuit of the Deep Learning Accelerator 203.

In some implementations, the Deep Learning Accelerator 203 and the random access memory 205 can be implemented on separate integrated circuit dies and connected using Through-Silicon Vias (TSV) for increased data bandwidth between the Deep Learning Accelerator 203 and the random access memory 205. For example, the Deep Learning Accelerator 203 can be formed on an integrated circuit die of a Field-Programmable Gate Array (FPGA) or Application Specific Integrated circuit (ASIC).

Alternatively, the Deep Learning Accelerator 203 and the random access memory 205 can be configured in separate integrated circuit packages and connected via multiple point-to-point connections on a printed circuit board (PCB) for parallel communications and thus increased data transfer bandwidth.

The random access memory 205 can be volatile memory or non-volatile memory, or a combination of volatile memory and non-volatile memory. Examples of non-volatile memory include flash memory, memory cells formed based on negative-and (NAND) logic gates, negative-or (NOR) logic gates, Phase-Change Memory (PCM), magnetic memory (MRAM), resistive random-access memory, cross point storage and memory devices. A cross point memory device can use transistor-less memory elements, each of which has a memory cell and a selector that are stacked together as a column. Memory element columns are connected via two lays of wires running in perpendicular directions, where wires of one lay run in one direction in the layer that is located above the memory element columns, and wires of the other lay run in another direction and are located below the memory element columns. Each memory element can be individually selected at a cross point of one wire on each of the two layers. Cross point memory devices are fast and non-volatile and can be used as a unified memory pool for processing and storage. Further examples of non-volatile memory include Read-Only Memory (ROM), Programmable Read-Only Memory (PROM), Erasable Programmable Read-Only Memory (EPROM) and Electronically Erasable Programmable Read-Only Memory (EEPROM) memory, etc. Examples of volatile memory include Dynamic Random-Access Memory (DRAM) and Static Random-Access Memory (SRAM).

For example, non-volatile memory can be configured to implement at least a portion of the random access memory 205. The non-volatile memory in the random access memory 205 can be used to store the model data of an Artificial Neural Network. Thus, after the integrated circuit device 201 is powered off and restarts, it is not necessary to reload the model data of the Artificial Neural Network into the integrated circuit device 201. Further, the non-volatile memory can be programmable/rewritable. Thus, the model data of the Artificial Neural Network in the integrated circuit device 201 can be updated or replaced to implement an update Artificial Neural Network, or another Artificial Neural Network.

The processing units 211 of the Deep Learning Accelerator 203 can include vector-vector units, matrix-vector units, and/or matrix-matrix units. Examples of units configured to perform for vector-vector operations, matrix-vector operations, and matrix-matrix operations are discussed below in connection with FIGS. 3-5.

Figure 3:
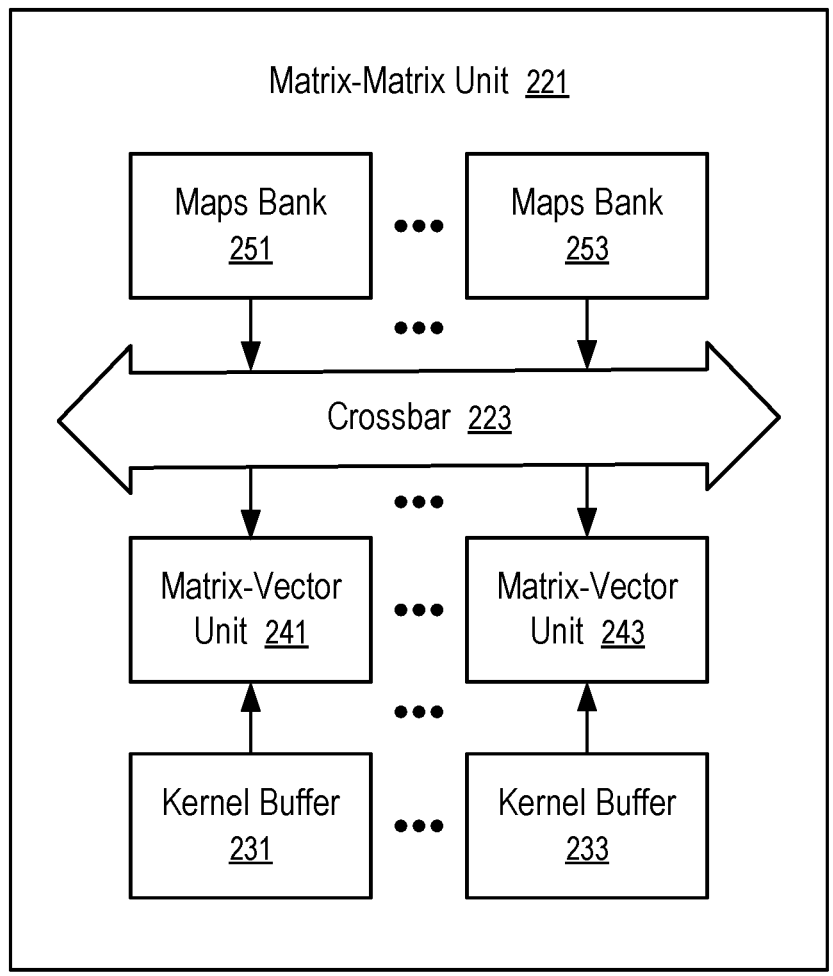
FIG. 3 shows a processing unit configured to perform matrix-matrix operations according to one embodiment.

FIG. 3 shows a processing unit configured to perform matrix-matrix operations according to one embodiment. For example, the matrix-matrix unit 221 of FIG. 3 can be used as one of the processing units 211 of the Deep Learning Accelerator 203 of FIG. 2.

In FIG. 3, the matrix-matrix unit 221 includes multiple kernel buffers 231 to 233 and multiple the maps banks 251 to 253. Each of the maps banks 251 to 253 stores one vector of a matrix operand that has multiple vectors stored in the maps banks 251 to 253 respectively; and each of the kernel buffers 231 to 233 stores one vector of another matrix operand that has multiple vectors stored in the kernel buffers 231 to 233 respectively. The matrix-matrix unit 221 is configured to perform multiplication and accumulation operations on the elements of the two matrix operands, using multiple matrix-vector units 241 to 243 that operate in parallel.

A crossbar 223 connects the maps banks 251 to 253 to the matrix-vector units 241 to 243. The same matrix operand stored in the maps bank 251 to 253 is provided via the crossbar 223 to each of the matrix-vector units 241 to 243; and the matrix-vector units 241 to 243 receives data elements from the maps banks 251 to 253 in parallel. Each of the kernel buffers 231 to 233 is connected to a respective one in the matrix-vector units 241 to 243 and provides a vector operand to the respective matrix-vector unit. The matrix-vector units 241 to 243 operate concurrently to compute the operation of the same matrix operand, stored in the maps banks 251 to 253 multiplied by the corresponding vectors stored in the kernel buffers 231 to 233. For example, the matrix-vector unit 241 performs the multiplication operation on the matrix operand stored in the maps banks 251 to 253 and the vector operand stored in the kernel buffer 231, while the matrix-vector unit 243 is concurrently performing the multiplication operation on the matrix operand stored in the maps banks 251 to 253 and the vector operand stored in the kernel buffer 233.

Figure 4:
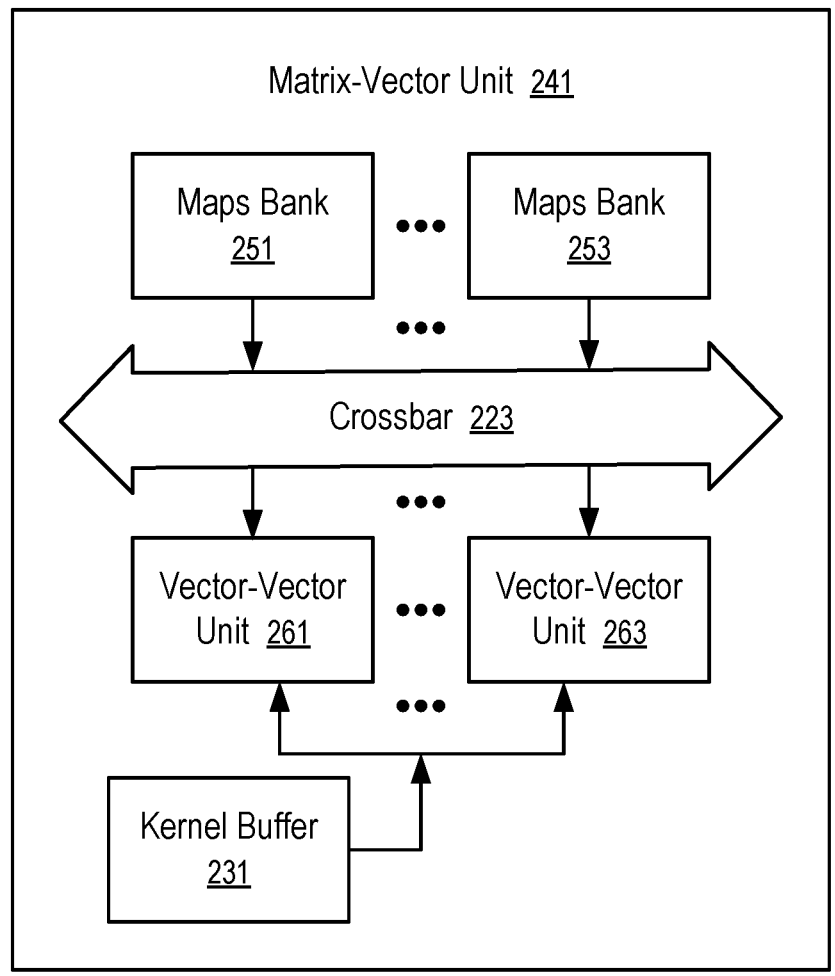
FIG. 4 shows a processing unit configured to perform matrix-vector operations according to one embodiment.

Each of the matrix-vector units 241 to 243 in FIG. 3 can be implemented in a way as illustrated in FIG. 4.

FIG. 4 shows a processing unit configured to perform matrix-vector operations according to one embodiment. For example, the matrix-vector unit 241 of FIG. 4 can be used as any of the matrix-vector units in the matrix-matrix unit 221 of FIG. 3.

In FIG. 4, each of the maps banks 251 to 253 stores one vector of a matrix operand that has multiple vectors stored in the maps banks 251 to 253 respectively, in a way similar to the maps banks 251 to 253 of FIG. 3. The crossbar 223 in FIG. 4 provides the vectors from the maps banks 251 to the vector-vector units 261 to 263 respectively. A same vector stored in the kernel buffer 231 is provided to the vector-vector units 261 to 263.

The vector-vector units 261 to 263 operate concurrently to compute the operation of the corresponding vector operands, stored in the maps banks 251 to 253 respectively, multiplied by the same vector operand that is stored in the kernel buffer 231. For example, the vector-vector unit 261 performs the multiplication operation on the vector operand stored in the maps bank 251 and the vector operand stored in the kernel buffer 231, while the vector-vector unit 263 is concurrently performing the multiplication operation on the vector operand stored in the maps bank 253 and the vector operand stored in the kernel buffer 231.

When the matrix-vector unit 241 of FIG. 4 is implemented in a matrix-matrix unit 221 of FIG. 3, the matrix-vector unit 241 can use the maps banks 251 to 253, the crossbar 223 and the kernel buffer 231 of the matrix-matrix unit 221.

Figure 5:
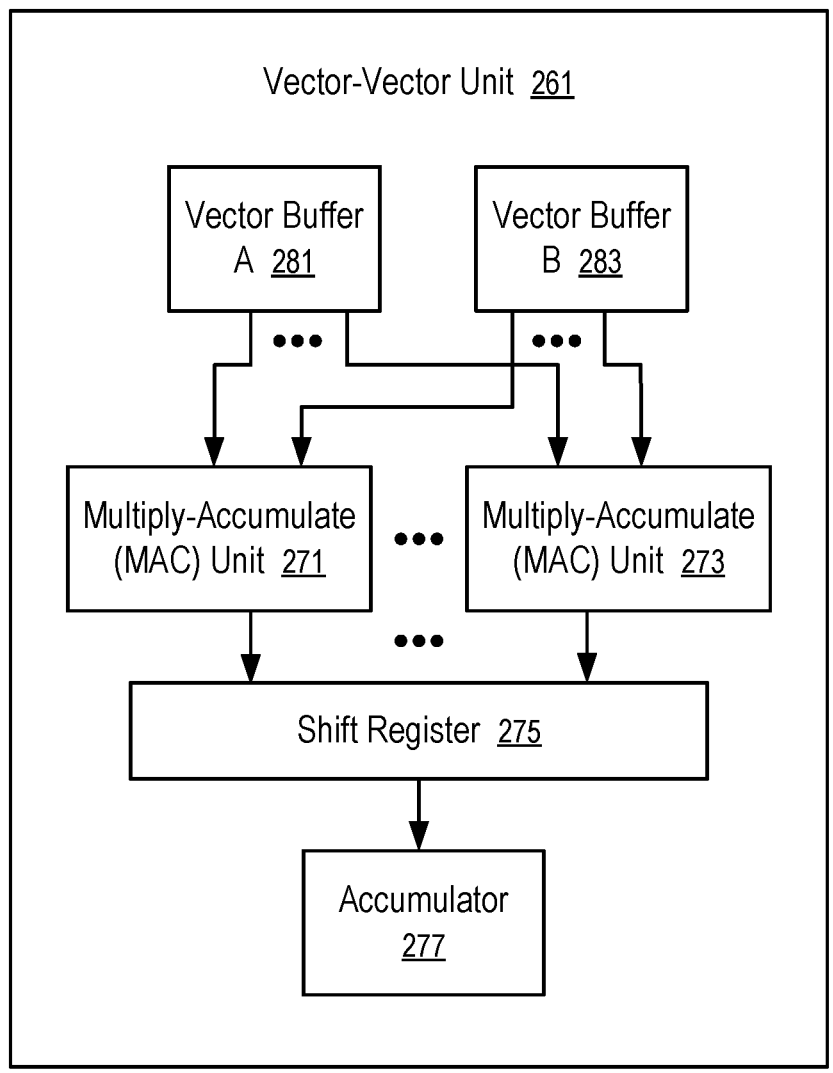
FIG. 5 shows a processing unit configured to perform vector-vector operations according to one embodiment.

Each of the vector-vector units 261 to 263 in FIG. 4 can be implemented in a way as illustrated in FIG. 5.

FIG. 5 shows a processing unit configured to perform vector-vector operations according to one embodiment. For example, the vector-vector unit 261 of FIG. 5 can be used as any of the vector-vector units in the matrix-vector unit 241 of FIG. 4.

In FIG. 5, the vector-vector unit 261 has multiple multiply-accumulate units 271 to 273. Each of the multiply-accumulate units (e.g., 273) can receive two numbers as operands, perform multiplication of the two numbers, and add the result of the multiplication to a sum maintained in the multiply-accumulate unit.

Each of the vector buffers 281 and 283 stores a list of numbers. A pair of numbers, each from one of the vector buffers 281 and 283, can be provided to each of the multiply-accumulate units 271 to 273 as input. The multiply-accumulate units 271 to 273 can receive multiple pairs of numbers from the vector buffers 281 and 283 in parallel and perform the multiply-accumulate (MAC) operations in parallel. The outputs from the multiply-accumulate units 271 to 273 are stored into the shift register 275; and an accumulator 277 computes the sum of the results in the shift register 275.

When the vector-vector unit 261 of FIG. 5 is implemented in a matrix-vector unit 241 of FIG. 4, the vector-vector unit 261 can use a maps bank (e.g., 251 or 253) as one vector buffer 281, and the kernel buffer 231 of the matrix-vector unit 241 as another vector buffer 283.

The vector buffers 281 and 283 can have a same length to store the same number/count of data elements. The length can be equal to, or the multiple of, the count of multiply-accumulate units 271 to 273 in the vector-vector unit 261. When the length of the vector buffers 281 and 283 is the multiple of the count of multiply-accumulate units 271 to 273, a number of pairs of inputs, equal to the count of the multiply-accumulate units 271 to 273, can be provided from the vector buffers 281 and 283 as inputs to the multiply-accumulate units 271 to 273 in each iteration; and the vector buffers 281 and 283 feed their elements into the multiply-accumulate units 271 to 273 through multiple iterations.

In one embodiment, the communication bandwidth of the connection 219 between the Deep Learning Accelerator 203 and the random access memory 205 is sufficient for the matrix-matrix unit 221 to use portions of the random access memory 205 as the maps banks 251 to 253 and the kernel buffers 231 to 233.

In another embodiment, the maps banks 251 to 253 and the kernel buffers 231 to 233 are implemented in a portion of the local memory 215 of the Deep Learning Accelerator 203. The communication bandwidth of the connection 219 between the Deep Learning Accelerator 203 and the random access memory 205 is sufficient to load, into another portion of the local memory 215, matrix operands of the next operation cycle of the matrix-matrix unit 221, while the matrix-matrix unit 221 is performing the computation in the current operation cycle using the maps banks 251 to 253 and the kernel buffers 231 to 233 implemented in a different portion of the local memory 215 of the Deep Learning Accelerator 203.

Figure 6:
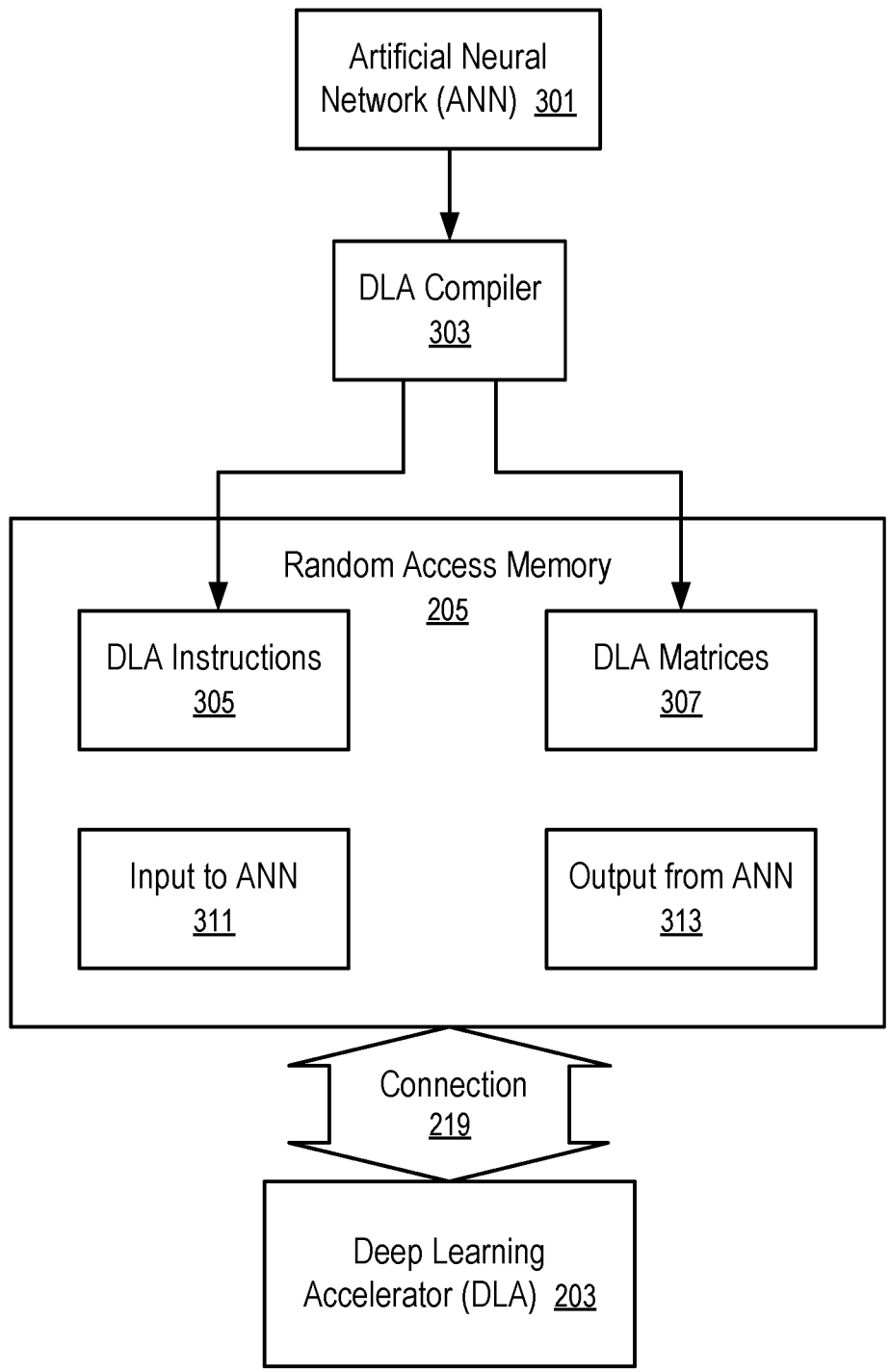
FIG. 6 shows a Deep Learning Accelerator and random access memory configured to autonomously apply inputs to a trained Artificial Neural Network for object detection according to one embodiment.

FIG. 6 shows a Deep Learning Accelerator and random access memory configured to autonomously apply inputs to a trained Artificial Neural Network for object detection according to one embodiment.

An Artificial Neural Network 301 that has been trained through machine learning (e.g., deep learning) to implement the object detector 103 of FIG. 1 can be described in a standard format (e.g., Open Neural Network Exchange (ONNX)). The description of the trained Artificial Neural Network 301 in the standard format identifies the properties of the artificial neurons and their connectivity.

In FIG. 6, a Deep Learning Accelerator compiler 303 converts trained Artificial Neural Network 301 by generating instructions 305 for a Deep Learning Accelerator 203 and matrices 307 corresponding to the properties of the artificial neurons and their connectivity. The instructions 305 and the matrices 307 generated by the DLA compiler 303 from the trained Artificial Neural Network 301 can be stored in random access memory 205 for the Deep Learning Accelerator 203.

For example, the random access memory 205 and the Deep Learning Accelerator 203 can be connected via a high bandwidth connection 219 in a way as in the integrated circuit device 201 of FIG. 2. The autonomous computation of FIG. 6 based on the instructions 305 and the matrices 307 can be implemented in the integrated circuit device 201 of FIG. 2. Alternatively, the random access memory 205 and the Deep Learning Accelerator 203 can be configured on a printed circuit board with multiple point to point serial buses running in parallel to implement the connection 219.

In FIG. 6, after the results of the DLA compiler 303 are stored in the random access memory 205, the application of the trained Artificial Neural Network 301 to process an input 311 to the trained Artificial Neural Network 301 to generate the corresponding output 313 of the trained Artificial Neural Network 301 can be triggered by the presence of the input 311 in the random access memory 205, or another indication provided in the random access memory 205.

In response, the Deep Learning Accelerator 203 executes the instructions 305 to combine the input 311 and the matrices 307. The matrices 307 can include kernel matrices to be loaded into kernel buffers 231 to 233 and maps matrices to be loaded into maps banks 251 to 253. The execution of the instructions 305 can include the generation of maps matrices for the maps banks 251 to 253 of one or more matrix-matrix units (e.g., 221) of the Deep Learning Accelerator 203.

In some embodiments, the inputs to Artificial Neural Network 301 is in the form of an initial maps matrix. Portions of the initial maps matrix can be retrieved from the random access memory 205 as the matrix operand stored in the maps banks 251 to 253 of a matrix-matrix unit 221. Alternatively, the DLA instructions 305 also include instructions for the Deep Learning Accelerator 203 to generate the initial maps matrix from the input 311.

According to the DLA instructions 305, the Deep Learning Accelerator 203 loads matrix operands into the kernel buffers 231 to 233 and maps banks 251 to 253 of its matrix-matrix unit 221. The matrix-matrix unit 221 performs the matrix computation on the matrix operands. For example, the DLA instructions 305 break down matrix computations of the trained Artificial Neural Network 301 according to the computation granularity of the Deep Learning Accelerator 203 (e.g., the sizes/dimensions of matrices that loaded as matrix operands in the matrix-matrix unit 221) and applies the input feature maps to the kernel of a layer of artificial neurons to generate output as the input for the next layer of artificial neurons.

Upon completion of the computation of the trained Artificial Neural Network 301 performed according to the instructions 305, the Deep Learning Accelerator 203 stores the output 313 of the Artificial Neural Network 301 at a pre-defined location in the random access memory 205, or at a location specified in an indication provided in the random access memory 205 to trigger the computation.

When the technique of FIG. 6 is implemented in the integrated circuit device 201 of FIG. 2, an external device connected to the memory controller interface 207 can write the input 311 (e.g., image 101) into the random access memory 205 and trigger the autonomous computation of applying the input 311 to the trained Artificial Neural Network 301 by the Deep Learning Accelerator 203. After a period of time, the output 313 (e.g., classification 115) is available in the random access memory 205; and the external device can read the output 313 via the memory controller interface 207 of the integrated circuit device 201.

For example, a predefined location in the random access memory 205 can be configured to store an indication to trigger the autonomous execution of the instructions 305 by the Deep Learning Accelerator 203. The indication can optionally include a location of the input 311 within the random access memory 205. Thus, during the autonomous execution of the instructions 305 to process the input 311, the external device can retrieve the output generated during a previous run of the instructions 305, and/or store another set of input for the next run of the instructions 305.

Optionally, a further predefined location in the random access memory 205 can be configured to store an indication of the progress status of the current run of the instructions 305. Further, the indication can include a prediction of the completion time of the current run of the instructions 305 (e.g., estimated based on a prior run of the instructions 305). Thus, the external device can check the completion status at a suitable time window to retrieve the output 313.

In some embodiments, the random access memory 205 is configured with sufficient capacity to store multiple sets of inputs (e.g., 311) and outputs (e.g., 313). Each set can be configured in a predetermined slot/area in the random access memory 205.

The Deep Learning Accelerator 203 can execute the instructions 305 autonomously to generate the output 313 from the input 311 according to matrices 307 stored in the random access memory 205 without helps from a processor or device that is located outside of the integrated circuit device 201.

In a method according to one embodiment, random access memory 205 of a computing device (e.g., integrated circuit device 201) can be accessed using an interface 207 of the computing device to a memory controller. The computing device can have processing units (e.g., 211) configured to perform at least computations on matrix operands, such as a matrix operand stored in maps banks 251 to 253 and a matrix operand stored in kernel buffers 231 to 233.

For example, the computing device, implemented using the integrated circuit device 201 and/or other components, can be enclosed within an integrated circuit package; and a set of connections can connect the interface 207 to the memory controller that is located outside of the integrated circuit package.

Instructions 305 executable by the processing units (e.g., 211) can be written into the random access memory 205 through the interface 207.

Matrices 307 of an Artificial Neural Network 301 can be written into the random access memory 205 through the interface 207. The matrices 307 identify the parameters, the property and/or the state of the Artificial Neural Network 301.

Optionally, at least a portion of the random access memory 205 is non-volatile and configured to store the instructions 305 and the matrices (307) of the Artificial Neural Network 301.

First input 311 to the Artificial Neural Network can be written into the random access memory 205 through the interface 207.

An indication is provided in the random access memory 205 to cause the processing units 211 to start execution of the instructions 305. In response to the indication, the processing units 211 execute the instructions to combine the first input 311 with the matrices 307 of the Artificial Neural Network 301 to generate first output 313 from the Artificial Neural Network 301 and store the first output 313 in the random access memory 205.

For example, the indication can be an address of the first input 311 in the random access memory 205; and the indication can be stored a predetermined location in the random access memory 205 to cause the initiation of the execution of the instructions 305 for the input 311 identified by the address. Optionally, the indication can also include an address for storing the output 313.

The first output 313 can be read, through the interface 207, from the random access memory 205.

For example, the computing device (e.g., integrated circuit device 201) can have a Deep Learning Accelerator 203 formed on a first integrated circuit die and the random access memory 205 formed on one or more second integrated circuit dies. The connection 219 between the first integrated circuit die and the one or more second integrated circuit dies can include Through-Silicon Vias (TSVs) to provide high bandwidth for memory access.

For example, a description of the Artificial Neural Network 301 can be converted using a compiler 303 into the instructions 305 and the matrices 307. The combination of the instructions 305 and the matrices 307 stored in the random access memory 205 and the Deep Learning Accelerator 203 provides an autonomous implementation of the Artificial Neural Network 301 that can automatically convert input 311 to the Artificial Neural Network 301 to its output 313.

For example, during a time period in which the Deep Learning Accelerator 203 executes the instructions 305 to generate the first output 313 from the first input 311 according to the matrices 307 of the Artificial Neural Network 301, the second input to Artificial Neural Network 301 can be written into the random access memory 205 through the interface 207 at an alternative location. After the first output 313 is stored in the random access memory 205, an indication can be provided in the random access memory to cause the Deep Learning Accelerator 203 to again start the execution of the instructions and generate second output from the second input.

During the time period in which the Deep Learning Accelerator 203 executes the instructions 305 to generate the second output from the second input according to the matrices 307 of the Artificial Neural Network 301, the first output 313 can be read from the random access memory 205 through the interface 207; and a further input can be written into the random access memory to replace the first input 311, or written at a different location. The process can be repeated for a sequence of inputs.

The Deep Learning Accelerator 203 can include at least one matrix-matrix unit 221 that can execute an instruction on two matrix operands. The two matrix operands can be a first matrix and a second matrix. Each of two matrices has a plurality of vectors. The matrix-matrix unit 221 can include a plurality of matrix-vector units 241 to 243 configured to operate in parallel. Each of the matrix-vector units 241 to 243 are configured to operate, in parallel with other matrix-vector units, on the first matrix and one vector from second matrix. Further, each of the matrix-vector units 241 to 243 can have a plurality of vector-vector units 261 to 263 configured to operate in parallel. Each of the vector-vector units 261 to 263 is configured to operate, in parallel with other vector-vector units, on a vector from the first matrix and a common vector operand of the corresponding matrix-vector unit. Further, each of the vector-vector units 261 to 263 can have a plurality of multiply-accumulate units 271 to 273 configured to operate in parallel.

The Deep Learning Accelerator 203 can have local memory 215 and a control unit 213 in addition to the processing units 211. The control unit 213 can load instructions 305 and matrix operands (e.g., some of the matrices 307) from the random access memory 205 for execution by the processing units 211. The local memory can cache matrix operands used by the matrix-matrix unit. The connection 219 can be configured with a bandwidth sufficient to load a set of matrix operands from the random access memory 205 to the local memory 215 during a time period in which the matrix-matrix unit performs operations on two other matrix operands. Further, during the time period, the bandwidth is sufficient to store a result, generated by the matrix-matrix unit 221 in a prior instruction execution, from the local memory 215 to the random access memory 205.

Figure 7:
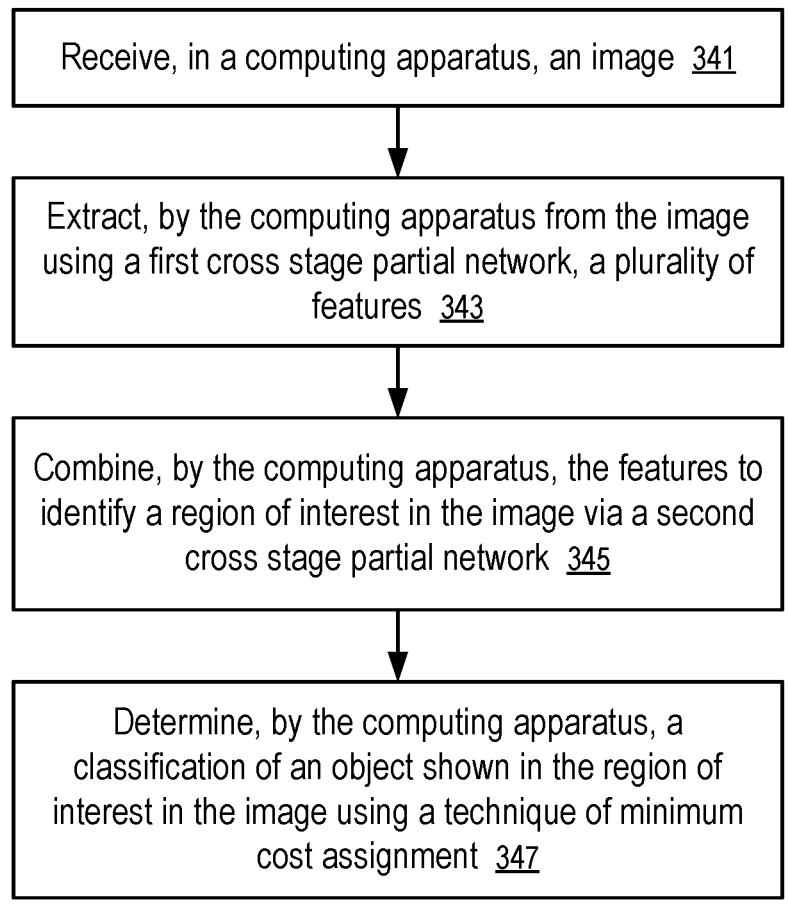
FIG. 7 shows a method of object detection according to one embodiment.

FIG. 7 shows a method of object detection according to one embodiment. For example, the method of FIG. 7 can be implemented using DLA instructions 305 and DLA matrices 307 generated from a description of the object detector of FIG. 1 for execution by a Deep Learning Accelerator 203 illustrated in FIGS. 2-5.

At block 341, a computing apparatus receives an image 101.

For example, the computing apparatus can include a random access memory and a plurality of processing units configured via instructions to perform the operations of object detection. The plurality of processing units can be configured in a Deep Learning Accelerator 203 illustrated in FIG. 2; and the computing apparatus has an integrated circuit package that encloses the computing apparatus with random access memory 205. Alternatively, a portion of the processing units can be in a central processing unit (CPU) and/or a graphics processing unit (GPU).

For example, the computing apparatus includes an integrated circuit die of a Field-Programmable Gate Array (FPGA) or Application Specific Integrated circuit (ASIC) implementing a Deep Learning Accelerator 203. The Deep Learning Accelerator 203 includes at least one processing unit 211 operable to perform matrix operations and a control unit 213 operable to load instructions 305 from random access memory for execution.

For example, the at least one processing unit 211 includes a matrix-matrix unit 221 to operate on two matrix operands of an instruction. The matrix-matrix unit 221 can include a plurality of matrix-vector units 241 to 243 operable in parallel; each of the plurality of matrix-vector units (e.g., 241) can include a plurality of vector-vector units 261 to 263 operable in parallel; and each of the plurality of vector-vector units (e.g., 261) can include a plurality of multiply-accumulate units (e.g., 271 to 273) operable in parallel.

At block 343, the computing apparatus extracts from the image 101, using a first cross stage partial network 106, a plurality of features 111.

For example, a backbone 105 of an object detector 103 can be implemented using the first cross stage partial network 106.

At block 345, the computing apparatus combines, the features 111 to identify a region of interest 113 in the image 101 via a second cross stage partial network 108.

For example, a neck 107 of the object detector 103 can be implemented using the second cross stage partial network 108.

At block 347, the computing apparatus determines, a classification 115 of an object shown in the region of interest 113 in the image 101 using a technique of minimum cost assignment 110.

For example, a head 109 of the object detector 103 can use minimum cost assignment 110 in object classification and bounding box regression to avoid post-processing operations of non-maximum suppression.

For example, the object detector 103 can be implemented using an artificial neural network 301 having the first cross stage partial network 106 and the second cross stage partial network 108. A compiler 303 generates, from data representative of a description of the artificial neural network 301, a compiler output configured to be executed on the computing apparatus to perform the operations at blocks 343 to 347.

For example, the compiler output can include instructions 305 executable by the Deep Learning Accelerator 203 to implement operations of the artificial neural network 301 and matrices 307 used by the instructions 305 during execution of the instructions 305 to implement the operations of the artificial neural network 301.

Figure 8:
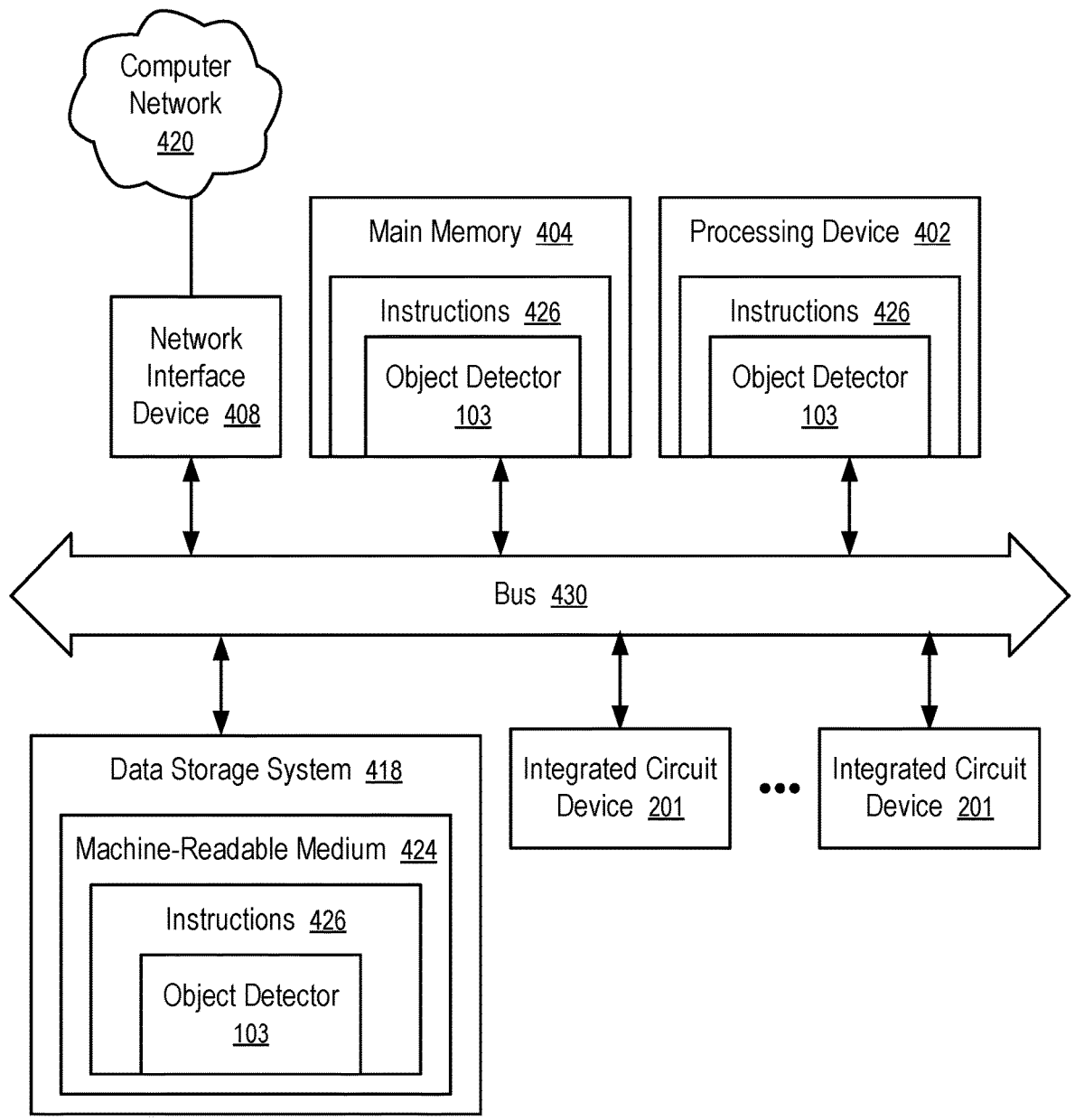
FIG. 8 shows a block diagram of an example computer system in which embodiments of the present disclosure can operate.

FIG. 8 illustrates an example machine of a computer system within which a set of instructions, for causing the machine to perform any one or more of the methodologies discussed herein, can be executed.

In some embodiments, the computer system of FIG. 8 can implement a system of FIG. 6 with integrated circuit devices 201 of FIG. 2 having matrix processing units illustrated in FIGS. 3-5. Each of the integrated circuit devices 201 can have an object detector 103.

The computer system of FIG. 8 can be used to perform the operations of a DLA Compiler 303 compiling an object detector 103 discussed with reference to FIGS. 1-7 and/or to execute instructions generated by the DLA Compiler 303 to implement the object detector 103 via a Deep Learning Accelerator 203 discussed with reference to FIGS. 1-7.

In some embodiments, the machine can be connected (e.g., networked) to other machines in a Local Area Network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

For example, the machine can be configured as a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system illustrated in FIG. 8 includes a processing device 402, a main memory 404, and a data storage system 418, which communicate with each other via a bus 430. For example, the processing device 402 can include one or more microprocessors; the main memory can include read-only memory (ROM), flash memory, dynamic random access memory (DRAM), such as synchronous DRAM (SDRAM) or Rambus DRAM (RDRAM), static random access memory (SRAM), etc. The bus 430 can include, or be replaced with, multiple buses, multiple point to point serial connections, and/or a computer network.

The processing device 402 in FIG. 8 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 402 can also be one or more special-purpose processing devices such as an application specific integrated circuit (ASIC), a field programmable gate array (FPGA), a digital signal processor (DSP), a network processor, or the like. The processing device 402 is configured to execute instructions 426 for performing the operations discussed in connection with the DLA compiler 303. Optionally, the processing device 402 can include a Deep Learning Accelerator 203.

The computer system of FIG. 8 can further include a network interface device 408 to communicate over a computer network 420.

Optionally, the bus 430 is connected to one or more integrated circuit devices 201 that each has a Deep Learning Accelerator 203 and Random Access Memory 205 illustrated in FIG. 2. The compiler 303 can write its compiler outputs into the Random Access Memory 205 of the integrated circuit devices 201 to enable the Integrated Circuit Devices 201 to perform matrix computations of an Artificial Neural Network 301 specified by the ANN description. Optionally, the compiler outputs can be stored into the Random Access Memory 205 of one or more other integrated circuit devices 201 through the network interface device 408 and the computer network 420.

The data storage system 418 can include a machine-readable medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system, the main memory 404 and the processing device 402 also constituting machine-readable storage media.

In one embodiment, the instructions 426 include instructions to implement functionality corresponding to a DLA Compiler 303, such as the DLA Compiler 303 described with reference to FIG. 6, and/or the DLA instructions 305 and DLA matrices 307 generated by the DLA Compiler 303 for the object detector 103. While the machine-readable medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

The present disclosure includes methods and apparatuses which perform the methods described above, including data processing systems which perform these methods, and computer readable media containing instructions which when executed on data processing systems cause the systems to perform these methods.

A typical data processing system may include an inter-connect (e.g., bus and system core logic), which interconnects a microprocessor(s) and memory. The microprocessor is typically coupled to cache memory.

The inter-connect interconnects the microprocessor(s) and the memory together and also interconnects them to input/output (I/O) device(s) via I/O controller(s). I/O devices may include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a USB (Universal Serial Bus) adapter for controlling USB peripherals, and/or an IEEE-2394 bus adapter for controlling IEEE-2394 peripherals.

The memory may include one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to non-transitory, recordable and non-recordable type media such as volatile and non-volatile memory devices, Read Only Memory (ROM), Random Access Memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:
   receiving, in a computing apparatus, data representative of an image;
   extracting, by the computing apparatus from the data using a first cross stage partial network, a plurality of features;
   combining, by the computing apparatus, the plurality of features to identify a single region of interest in the image via a second cross stage partial network; and
   determining, by the computing apparatus, a classification of an object shown in the single region of interest in the image using a technique of minimum cost assignment.

2. The method of claim 1, further comprising:
   receiving data representative of a description of an artificial neural network having the first cross stage partial network and the second cross stage partial network; and
   generating, from the data representative of the description of the artificial neural network, a compiler output configured to be executed on the computing apparatus to perform the extracting, the combining, and the determining.

3. The method of claim 2, wherein the computing apparatus includes an integrated circuit die of a field-programmable gate array or application specific integrated circuit implementing a deep learning accelerator, the deep learning accelerator comprising at least one processing unit configured to perform matrix operations and a control unit configured to load instructions from random access memory for execution.

4. The method of claim 3, wherein the compiler output includes the instructions executable by the deep learning accelerator to implement operations of the artificial neural network and matrices used by the instructions during execution of the instructions to implement the operations of the artificial neural network.

5. The method of claim 4, wherein the at least one processing unit includes a matrix-matrix unit configured to operate on two matrix operands of an instruction.

6. The method of claim 5, wherein:
   the matrix-matrix unit includes a plurality of matrix-vector units configured to operate in parallel;
   each of the plurality of matrix-vector units includes a plurality of vector-vector units configured to operate in parallel; and
   each of the plurality of vector-vector units includes a plurality of multiply-accumulate units configured to operate in parallel.

7. A computing apparatus, comprising:
   memory; and
   a plurality of processing units configured to:
      extract a plurality of features from an image using a first cross stage partial network;
      combine the plurality of features to identify a single region of interest in the image via a second cross stage partial network; and
      determine a classification of an object shown in the single region of interest in the image using a technique of minimum cost assignment.

8. The computing apparatus of claim 7, wherein the plurality of processing units are configured via a compiler output generated by a compiler from data representative of a description of an artificial neural network having the first cross stage partial network and the second cross stage partial network.

9. The computing apparatus of claim 8, wherein the compiler output includes instructions executable by the plurality of processing units to implement operations of the artificial neural network and matrices used by the instructions during execution of the instructions to implement the operations of the artificial neural network.

10. The computing apparatus of claim 9, further comprising:
    an integrated circuit package configured to enclose the computing apparatus.

11. The computing apparatus of claim 10, further comprising:
    an integrated circuit die of a field-programmable gate array or application specific integrated circuit implementing a deep learning accelerator having the plurality of processing units, including at least one processing unit configured to perform matrix operations and a control unit configured to load instructions from the memory for execution.

12. The computing apparatus of claim 11, wherein the at least one processing unit includes a matrix-matrix unit configured to operate on two matrix operands of an instruction.

13. The computing apparatus of claim 12, wherein:
the matrix-matrix unit includes a plurality of matrix-vector units configured to operate in parallel;
each of the plurality of matrix-vector units includes a plurality of vector-vector units configured to operate in parallel; and
each of the plurality of vector-vector units includes a plurality of multiply-accumulate units configured to operate in parallel.

14. A non-transitory computer storage medium storing instructions which when executed by a computing apparatus cause the computing apparatus to perform a method, the method comprising:
extracting, by the computing apparatus from an image using a first cross stage partial network, a plurality of features;
combining, by the computing apparatus, the plurality of features to identify a single region of interest in the image via a second cross stage partial network; and
determining, by the computing apparatus, a classification of an object shown in the single region of interest in the image using a technique of minimum cost assignment.

15. The non-transitory computer storage medium of claim 14, wherein the instructions are generated by a compiler from a description of an artificial neural network having the first cross stage partial network and the second cross stage partial network.

16. The non-transitory computer storage medium of claim 15, wherein the compiler is configured for an integrated circuit die of a field-programmable gate array or application specific integrated circuit implementing a deep learning accelerator, the deep learning accelerator comprising at least one processing unit configured to perform matrix operations and a control unit configured to load instructions from random access memory for execution.

17. The non-transitory computer storage medium of claim 16, wherein the at least one processing unit includes a matrix-matrix unit configured to operate on two matrix operands of an instruction.

18. The non-transitory computer storage medium of claim 17, wherein:
the matrix-matrix unit includes a plurality of matrix-vector units configured to operate in parallel;
each of the plurality of matrix-vector units includes a plurality of vector-vector units configured to operate in parallel; and
each of the plurality of vector-vector units includes a plurality of multiply-accumulate units configured to operate in parallel.

19. The non-transitory computer storage medium of claim 18, wherein the compiler is further configured to generate, from the description of the artificial neural network, matrices used by the instructions during execution of the instructions to implement operations of the artificial neural network.

20. The non-transitory computer storage medium of claim 19, further storing the matrices generated by the compiler from the description of the artificial neural network.

* * * * *